(12) United States Patent
Katsuya et al.

(10) Patent No.: US 6,507,381 B1
(45) Date of Patent: Jan. 14, 2003

(54) LIQUID CRYSTAL PANEL HAVING TILTED LIQUID CRYSTAL MOLECULES AND LIQUID CRYSTAL DISPLAY USING THE LIQUID CRYSTAL PANEL

(75) Inventors: Yoko Katsuya, Nara; Shinji Shimada, Kashihara; Kiyoshi Ogishima; Yutaka Takafuji, both of Nara, all of (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/079,285

(22) Filed: May 15, 1998

(30) Foreign Application Priority Data

May 26, 1997 (JP) .............................. 9-135524
Oct. 16, 1997 (JP) .............................. 9-283978

(51) Int. Cl.[7] .............................................. G02F 1/133
(52) U.S. Cl. ........................................ 349/130; 345/87
(58) Field of Search .................... 349/178, 136, 349/123, 37, 13 D; 345/96, 87

(56) References Cited

U.S. PATENT DOCUMENTS

| | | | | |
|---|---|---|---|---|
| 4,516,834 A | * | 5/1985 | Cascini ........................ | 350/335 |
| 5,011,267 A | * | 4/1991 | Miller et al. ................. | 349/130 |
| 5,182,664 A | * | 1/1993 | Clerc ........................... | 359/93 |
| 5,384,650 A | * | 1/1995 | TeKolste et al. .............. | 359/77 |
| 5,396,355 A | * | 3/1995 | Wada et al. ................... | 359/73 |
| 5,398,127 A | * | 3/1995 | Kubota et a. ................. | 349/126 |
| 5,477,359 A | * | 12/1995 | Oakzaki ....................... | 349/130 |
| 5,686,980 A | * | 11/1997 | Hirayama et al. .......... | 349/110 |
| 5,790,092 A | * | 8/1998 | Moriyama .................... | 345/96 |
| 5,844,646 A | * | 12/1998 | Yanai .......................... | 349/110 |

FOREIGN PATENT DOCUMENTS

| | | | |
|---|---|---|---|
| JP | 62-237421 | | 10/1987 |
| JP | 62-186113 | | 11/1987 |
| JP | 01206316 | | 8/1989 |
| JP | 01-270024 | | 10/1989 |
| JP | 2-151830 | | 6/1990 |
| JP | 2-211424 | | 8/1990 |
| JP | 03-46623 | | 2/1991 |
| JP | 3-107925 | A | 5/1991 |
| JP | 3-163417 | * | 7/1991 |
| JP | 3-192217 | * | 8/1991 |
| JP | 06-337421 | | 12/1994 |
| JP | 08-029750 | | 2/1996 |
| JP | 09-190162 | | 7/1997 |
| JP | 10-031216 | | 2/1998 |
| JP | 10-301112 | | 11/1998 |

OTHER PUBLICATIONS

Hatoh et al, "Molecular tilt direction in a slightly tilted homeotropic aligned liquid crystal cell", Appl. Phys Lett 63 (26)3577–35779, Dec. 1993.*
Seki et al, "Tilted Homeotrophic Alignemnt of Liquid Crystal Molecules Using the Rubbing Method", Japanese Journal of Applied Physics, vol 29, # 12, pp. 2236–2238, Dec. 1990.*

* cited by examiner

*Primary Examiner*—Kenneth Parker
(74) *Attorney, Agent, or Firm*—Nixon & Vanderhye P.C.

(57) ABSTRACT

A liquid crystal layer, made of a liquid crystal material having a negative dielectric anisotropy, is sealed between an opposing substrate and a pixel substrate that are arranged face to face with each other; thus, a liquid crystal panel of the birefringence control type is constructed. In this liquid crystal panel, the liquid crystal molecules, provided as the liquid crystal material, are kept in an oriented state in which they incline by an angle in the range of 3° to 10° with respect to the direction that is normal to the opposing substrate and the pixel substrate. Upon application of a driving voltage to the liquid crystal layer, since the pretilt angle, which is the initial angle of inclination of the liquid crystal molecules, is set at a value greater than that of a conventional apparatus, the occurrence of reverse tilt regions can be suppressed. Thus, the disclination line, which is formed by the effect of electric potentials exerted between the adjacent pixels, is shifted toward the edge of the pixel. The shift of the disclination line suppresses the occurrence of disclination in a wider region, thereby increasing the effective reflectance of the pixels.

3 Claims, 12 Drawing Sheets

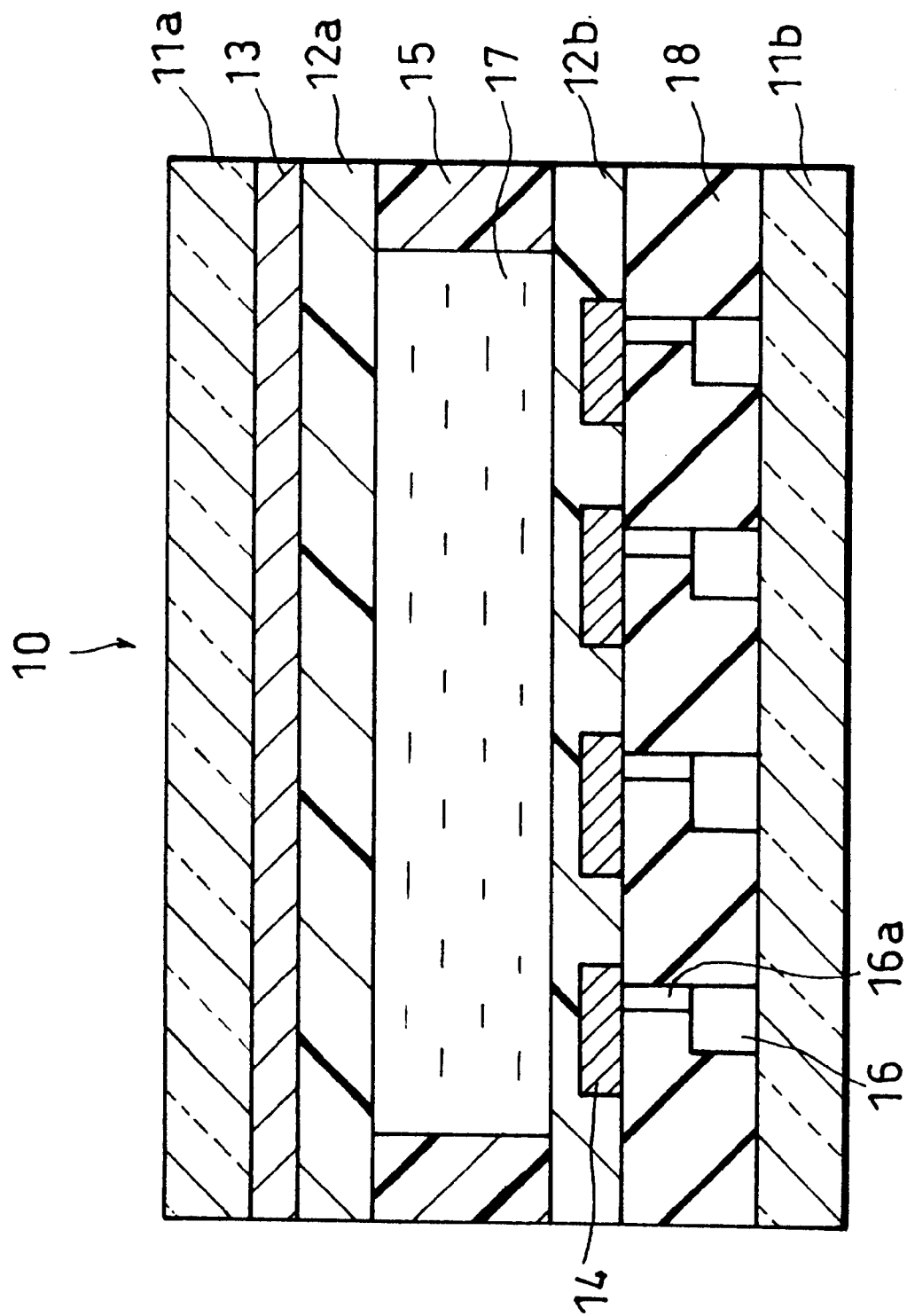

FIG.10 (a)
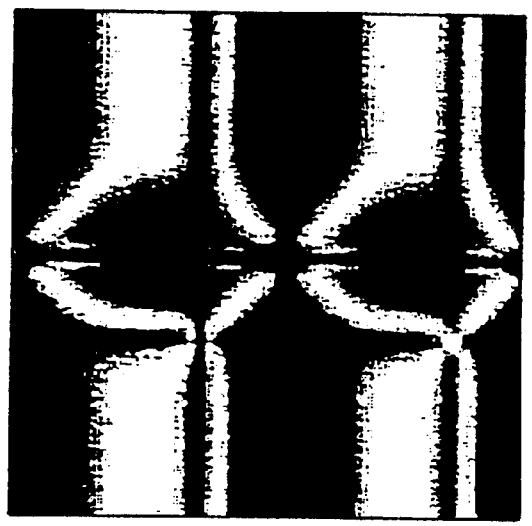
FIG.10 (b)
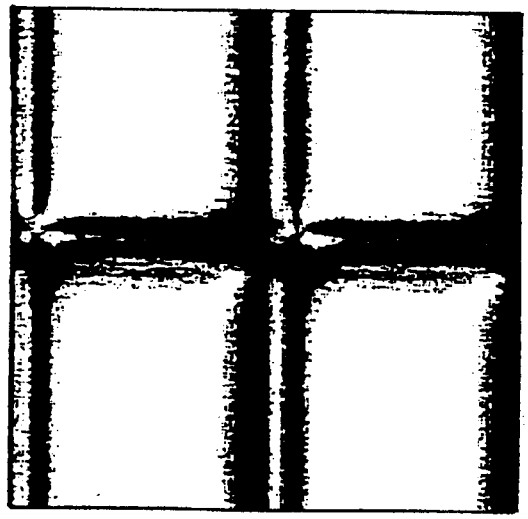
FIG.10 (c)
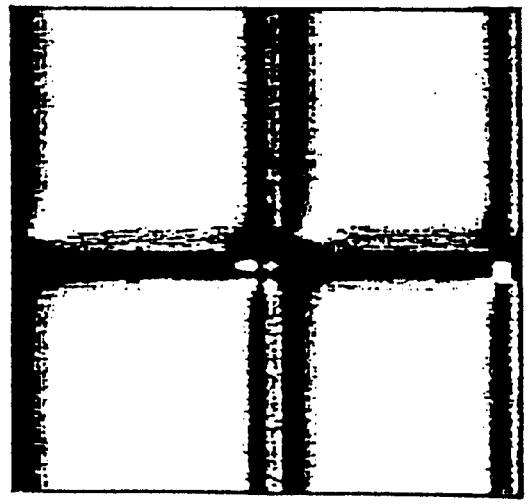

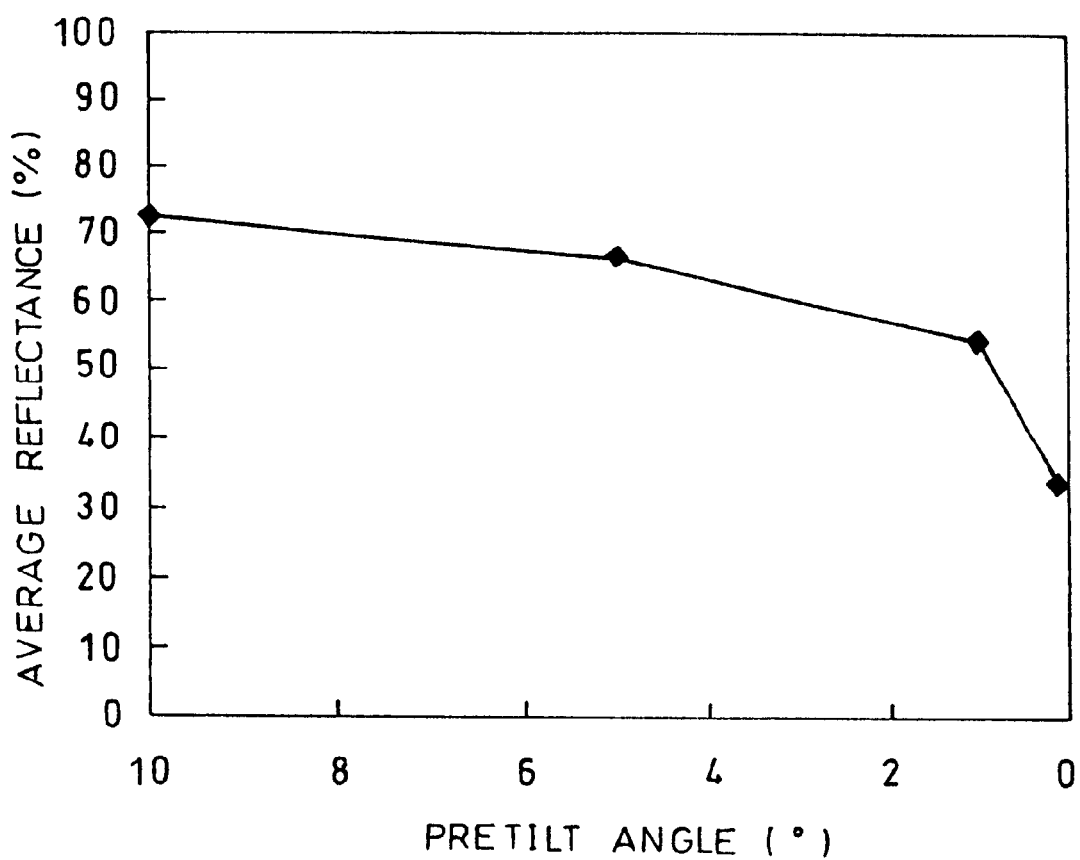
F I G. 11

LIQUID CRYSTAL PANEL HAVING TILTED LIQUID CRYSTAL MOLECULES AND LIQUID CRYSTAL DISPLAY USING THE LIQUID CRYSTAL PANEL

FIELD OF THE INVENTION

The present invention relates to a liquid crystal panel that carries out image display by using the birefringence control system, and also concerns a liquid crystal display using such as liquid crystal panel.

BACKGROUND OF THE INVENTION

Conventionally, the birefringence control system has been known as a method for controlling motion of liquid crystal molecules. In this system, a driving voltage is applied to liquid crystal molecules that are oriented perpendicularly to the substrate plane. Thus, the liquid crystal molecules are tilted in accordance with the driving voltage so that an image is displayed by controlling light transmission by using the resulting changes in birefringence.

In a liquid crystal panel used for such a liquid crystal display, in general, an opposing substrate, which is provided with a common electrode and an alignment film, and a pixel substrate, which is provided with a plurality of pixel electrodes and an alignment film, are arranged face to face with each other; a liquid crystal layer is sealed between these substrates; and a pair of polarizing plates are placed on the outside of these substrates.

In the liquid crystal panel of this type, in the case when the liquid crystal molecules 52 of the liquid crystal layer 53 are oriented in a completely perpendicular state with respect to the opposing substrate 51a or the pixel substrate 51b as illustrated in FIG. 14, the liquid crystal molecules tend to incline in random directions upon application of the driving voltage, with the result that the quality of displayed images is greatly reduced. For this reason, in a state in which no driving voltage is applied, the liquid crystal molecules are preliminarily tilted with a given angle (a pretilt angle). This makes it possible to preferably determine the oriented state of the liquid crystal molecules when the driving voltage is applied.

As one example of the liquid crystal display of this type, Japanese Laid-Open Patent Publication No. 151830/1990 (Tokukaihei 2-151830) discloses a liquid crystal display in which the orientation of a pretilt angle is set only either on the opposing substrate or on the pixel substrate so as to determine the oriented state of the liquid crystal molecules. Moreover, as examples of liquid crystal displays in which the orientation control for liquid crystal molecules is disclosed, those liquid crystal displays, obtained by a manufacturing method disclosed by Japanese Laid-Open Patent Publication No. 211424/1990 (Tokukaihei 2-211424), or disclosed by Japanese Laid-Open Patent Publication No. 107925/1991 (Tokukaihei 3-107925), have been known. In the former liquid crystal display, in addition to the perpendicular alignment process applied to the substrate, a rubbing treatment is further carried out so as to control the orientation of the liquid crystal molecules. In the latter liquid crystal display, a polyimide film is used as a perpendicular alignment film, and the liquid crystal molecules are oriented by rubbing the polyimide film.

In the conventional liquid crystal displays, it is proposed that the pretilt angle of the liquid crystal molecules be preferably set in the range of 0.5° to 3° with respect to the direction that is normal to the pixel substrate, and most preferably set in the range of 0.5° to 1°.

Moreover, conventionally, in liquid crystal panels used for the above-mentioned liquid crystal display, a modification, such as minimizing regions except for the pixel electrodes, that is, for example, non-display sections located between the pixels, has been carried out. This is made so as to obtain brighter display images on the liquid crystal panel by making the pixel electrodes as large as possible and thereby maintaining a large effective display area. In this case, when the pixel electrodes are made as large as possible, the distance between the adjacent pixels is made smaller than or virtually the same as the cell thickness (the cell gap of the liquid crystal layer).

When the distance between the adjacent pixels is made smaller, the electric field exerted between the pixel electrodes in each pixel in the horizontal direction becomes stronger. The resulting electric field in the horizontal direction gives adverse effects on the orientation of liquid crystal molecules located between pixels, thereby causing a disorder in the orientation of the liquid crystal molecules. The disorder in the orientation of the liquid crystal molecules results in a reverse tilt region which makes the orientation direction of the liquid crystal molecules between the pixels reverse to the direction of those in other regions.

In the above-mentioned reverse tilt region, lines due to disclination, which are borders between different orientations of the liquid crystal molecules, take place on an image. In the region including these lines, the displayed image becomes dark, the luminance is reduced. Further, the display quality of the image itself decreases, merely providing rough, low-resolution images.

The above-mentioned adverse effects are particularly noticeable in high-precision liquid crystal panels using driving systems such as line inversion driving (V-inversion (Vertical-inversion) driving) and dot-inversion driving. In these cases, the entire liquid crystal panel becomes dark, and the display quality is excessively reduced.

Here, the application of the above-mentioned pretilt angle to the liquid crystal molecules allows the orientation of the liquid crystal to avoid the disorder due to the horizontal electric field, thereby making it possible to suppress the occurrence of the reverse tilt region. Consequently, it is possible to prevent the occurrence of disclination in a wider region, and also to avoid the above-mentioned adverse effects.

However, the condition for providing a pretilt angle in the range of 0.5° to 3° as described earlier is only applied to cases in which the region of non-display sections is large to a certain degree. In other words, in cases where the aperture section, which is the effective display section, is not so large in each pixel that the region of non-display sections is appropriately provided, the region of disclination can be shielded by a black matrix, etc. that is a non-display section under the condition that the above-mentioned pretilt angle is satisfied.

Under the above-mentioned condition, since the region of disclination is not used for image display, the resulting display screen makes it possible to provide a liquid crystal display that has a sufficiently satisfactory contrast. However, when the non-display section is reduced as the aperture section of the pixel is increased, it becomes more difficult to shield the region having disordered orientation by the non-display section such as the black matrix.

In particular, in the case of liquid crystal panels of the reflection type utilizing polarizing light, the black matrix is formed on the opposing substrate side. This case requires a margin for allowing substrates to be bonded to each other, thereby requiring a wider black-matrix region. This arrangement raises no problem in shielding the region of disclination, but raises a problem in expanding the effective display area.

SUMMARY OF THE INVENTION

One of the objectives of the present invention is to suppress disclination from occurring in a wide region by setting a pretilt angle of liquid crystal molecules at an angle within a predetermined range so that a liquid crystal panel having a large effective display area is achieved.

The other objective of the present invention is to provide a liquid crystal display of the birefringence control system having high display quality by using the above-mentioned liquid crystal panel.

In order to achieve the above-mentioned objectives, the liquid crystal panel of the present invention, which is a liquid crystal panel of the birefringence control system, is provided with: an opposing substrate and a pixel substrate that are arranged face to face with each other; and a liquid crystal layer that is sealed between the opposing substrate and the pixel substrate, and the liquid crystal layer has an oriented state in which liquid crystal molecules that have a negative dielectric anisotropy incline by an angle in the range of 3° to 10° with respect to the direction that is normal to the pixel substrate.

In the above-mentioned arrangement, upon application of a driving voltage to the liquid crystal layer, since the pretilt angle, which is the initial tilt angle of the liquid crystal molecules, is larger than a conventional value (0.5° to 3°), it is possible to suppress the occurrence of a reverse tilt region. Consequently, lines of disclination due to electric potentials exerted between the adjacent pixels are shifted toward the edges of each pixel. The shift of the lines of disclination suppresses the occurrence of disclination in a wide region, thereby increasing the effective reflectance of the pixels.

Moreover, since the pretilt angle greater than that of a conventional device allows the tilt angle of liquid crystal molecules to rapidly change, it is possible to increase the response speed of the liquid crystal molecules. Thus, the image-writing time on the liquid crystal panel can be shortened.

Therefore, it becomes possible to provide a liquid crystal display which has a high efficiency in utilization of incident light, can display brighter images, and enables a response at high speeds.

For a fuller understanding of the nature and advantages of the invention, reference should be made to the ensuing detailed description taken in conjunction with the accompanying drawings.

BRIEF DESCRIPTION OF THE DRAWINGS

FIG. 2 is a cross-sectional view showing the construction of the liquid crystal panel having the liquid crystal layer of FIG. 1(a).

FIGS. 10(a) through 10(c) are explanatory drawings that show images obtained by image-displaying simulations in the liquid crystal panel of FIG. 2.

FIG. 11 is a graph that shows the relationship between the average reflectance and the pretilt angle in the liquid crystal panel used in the liquid crystal display of the present invention.

DESCRIPTION OF THE EMBODIMENTS

Figure 1A:
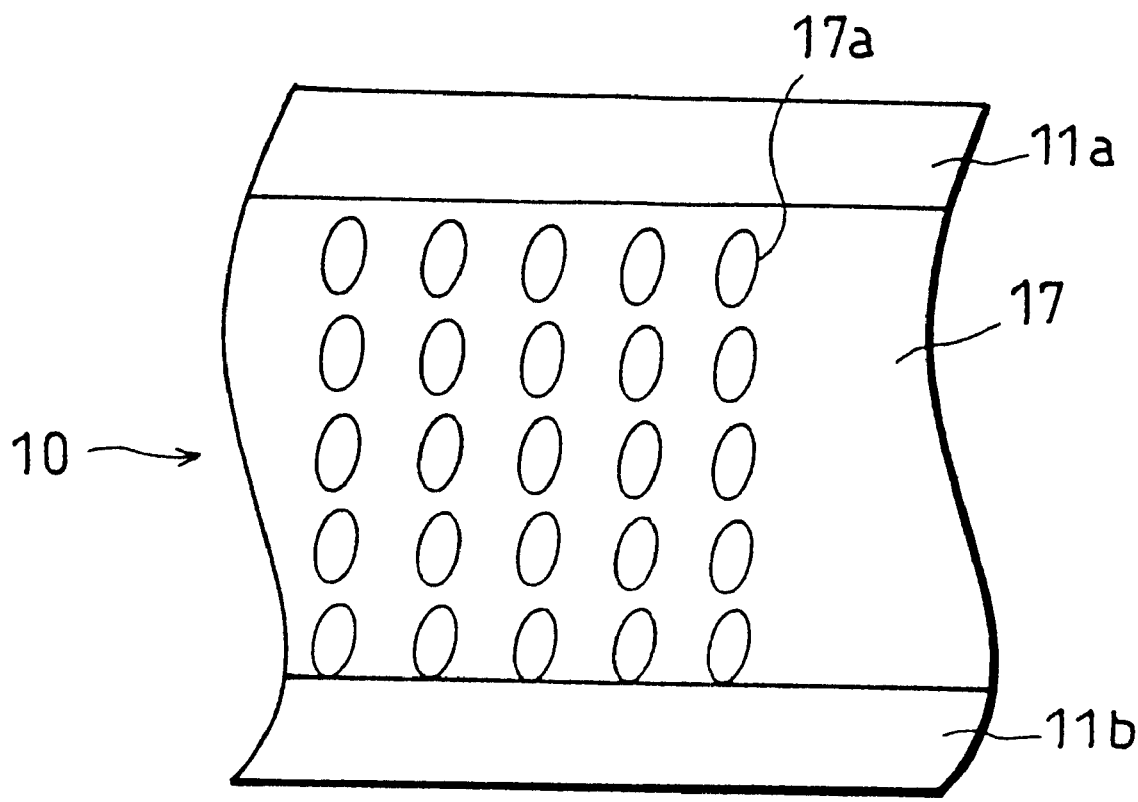
FIG. 1(a) is a schematic cross-sectional view that shows a state in which liquid crystal molecules are oriented in a tilted manner in a liquid crystal layer in a liquid crystal panel used in a liquid crystal display of one embodiment of the present invention.

Referring to Figures, the following description will discuss one embodiment of the present invention. Here, the present invention is not intended to be limited thereby.

In the present embodiment, an explanation will be given by exemplifying a projection-type liquid crystal display for displaying images by using the birefringence control, in which a reflection-type liquid crystal panel is adopted in the active-matrix system.

As illustrated in FIG. 2, a reflection-type liquid crystal panel 10, used in the liquid crystal display of the present invention, is constituted by an opposing substrate 11a and a pixel substrate 11b that are placed face to face with each other and a liquid crystal layer 17 that is sealed in between by using sealer 15. A transparent electrode layer 13 and an alignment film 12a are stacked in this order on the surface of the opposing substrate 11a that faces the pixel substrate 11b. The transparent electrode layer 13 forms a common electrode made from ITO (indium tin oxide), etc. Further, the alignment film 12a is made from polyimide, polyvinyl alcohol, etc. Additionally, liquid crystal panels that are used in common direct-sight reflection-type liquid crystal displays, etc. are provided with color filters, etc. other than the above-mentioned elements.

Similarly, a plurality of pixel electrodes 14 and thin-film transistors 16 (hereinafter, referred to as TFT) and an alignment film 12b are formed on the surface of the pixel substrate 11b that faces the opposing substrate 11a. The pixel electrodes 14 are made from ITO, etc. The TFTs 16 are driving elements for driving the pixel electrodes 14. Further, the alignment film 12b is made from polyimide. The pixel electrodes 14 are commonly arranged in a matrix format with several hundreds of them forming one unit, and a plurality of the color filters are formed thereon at their corresponding positions. Moreover, since the liquid crystal panel 10 of the present embodiment is a liquid crystal panel of the reflection type, the pixel electrodes 14 are made of a material having a high light reflectance.

Figure 3:
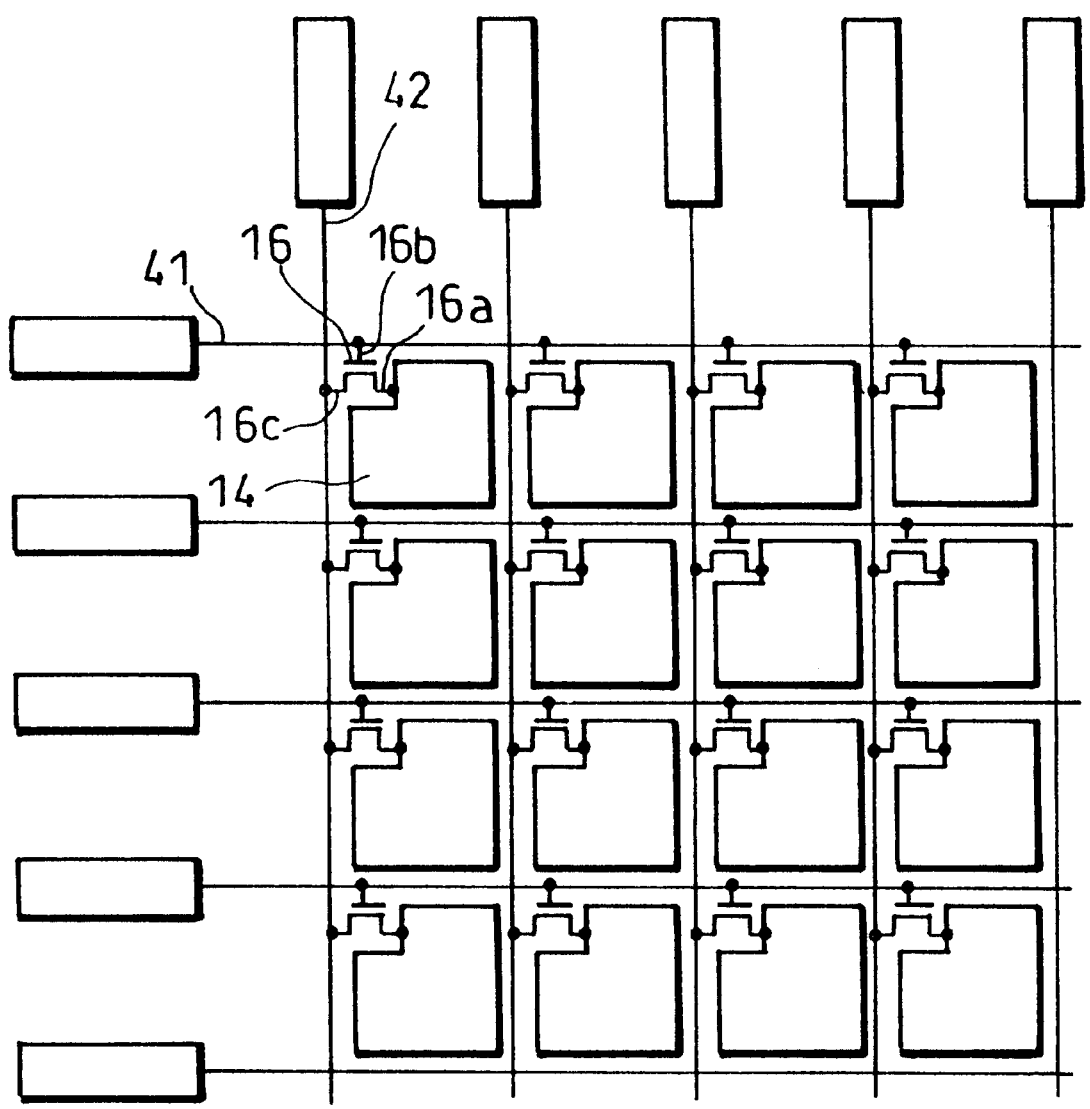
FIG. 3 is a circuit diagram showing a construction of a pixel substrate in the liquid crystal panel of FIG. 2.

Source electrodes 16a of the TFTs 16 are connected to the corresponding pixel electrodes 14. Further, an inter-layer insulating film 18, made of an organic high-polymer film, is formed between the pixel electrodes 14 and the TFTs 16 so as to flatten the formation surface of the pixel electrodes 14. As illustrated in FIG. 3, one scanning line 41 and one data line 42 are connected to each of the TFTs 16. The scanning line 41 is connected to the gate electrode 16b of each TFT 16, and the data line 42 is connected to the drain electrode 16c of each TFT 16. As also illustrated in FIG. 2, the source electrode 16a of each TFT 16 is connected to each pixel electrode 14.

A plurality of these scanning lines 41 and data lines 42 are formed on the pixel substrate 11b. The scanning lines 41 are formed in a right to left direction (hereinafter, referred to as a horizontal direction) with respect to an image displayed on the resulting liquid crystal panel 10, in parallel with each other. The data lines 42 are, on the other hand, formed in a direction orthogonal to the direction in which the scanning lines 41 are formed (hereinafter, referred to as a vertical direction) in parallel with each other.

In other words, the scanning lines 41 and the data lines 42 are formed on the pixel substrate 11b in a manner so as to be orthogonal to each other, and each TFT 16 is formed at an intersection between each scanning line 41 and each data line 42. Further, pixel electrodes 14 are respectively formed at a plurality of regions surrounded by the scanning lines 41 and the data lines 42.

Figure 1B:
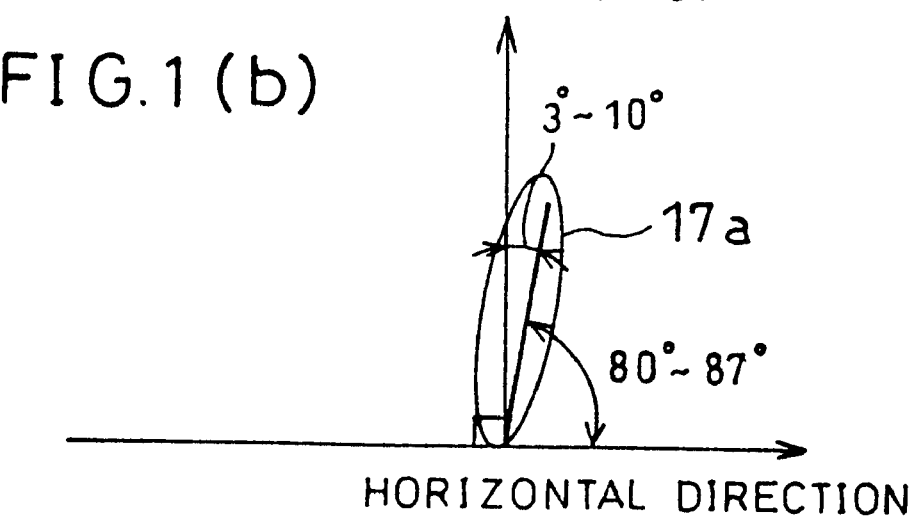
FIG. 1(b) is an explanatory drawing that shows a tilt angle of the liquid crystal molecules in the liquid crystal panel of FIG. 1(a).

As illustrated in FIGS. 1(a) and 1(b), each of liquid crystal molecules 17a that serve as a liquid crystal material forming the liquid crystal layer 17 inclines with a pretilt angle in the range of 3° to 10° with respect to the direction that is normal to the opposing substrate 11a or the pixel substrate 11b. As illustrated in FIG. 1(b), this state may be regarded as a state in which each of the liquid crystal molecules 17a inclines with a pretilt angle in the range of 80° to 87° with respect to the horizontal direction of the opposing substrate 11a or the pixel substrate 11b.

Each of the surfaces of the alignment films 12a and 12b is preliminarily subjected to an alignment process such as a rubbing process so that the liquid crystal molecules 17a located in between are inclinedly oriented with the above-mentioned pretilt angle. The direction of the alignment process is the same in both the alignment films 12a and 12b, and is set with an angle of virtually 45° with respect to the direction in which the scanning lines 41 are placed on the pixel electrodes 14 that are formed on the pixel substrate 11b. In other words, in this state, the liquid crystal molecules 17a of the liquid crystal layer 17 are not twisted since the orientation directions of the upper and lower alignment films 12a and 12b are the same.

Figure 4A:
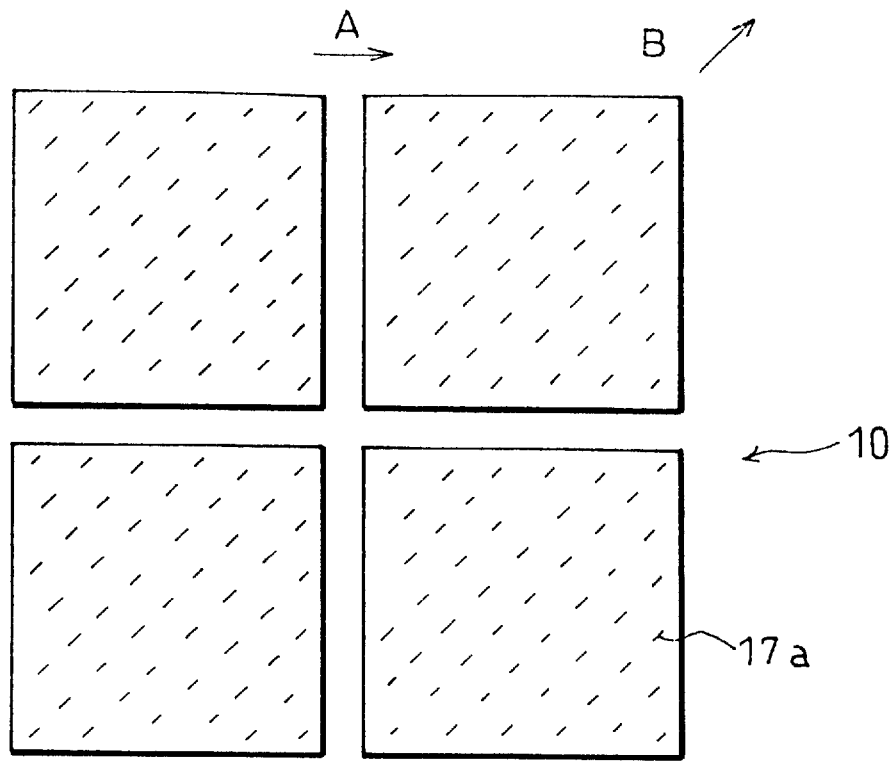
FIG. 4(a) is a schematic drawing that shows an oriented state of the liquid crystal molecules in the case when no driving voltage is applied to the liquid crystal panel of FIG. 2.

More specifically, as illustrated in FIG. 1(b), in a state where no driving voltage is applied to the liquid crystal panel 10, the liquid crystal molecules 17a incline with an angle in the range of 3° to 10° from the direction that is normal to the pixel substrate 11b as described above. Moreover, as illustrated in FIG. 4(a), because of the alignment process applied to the alignment films 12a and 12b, the liquid crystal molecules 17a are oriented in a direction (in an arrow B direction) with approximately 45° with respect to the arrow A direction (the direction in which the scanning lines 41 are formed) that is the above-mentioned horozontal direction. In other words, in this state, the liquid crystal molecules 17a are standing while inclining with an angle in the range of 3° to 10° with respect to the opposing substrate 11a or the pixel substrate 11b, and the direction of the inclination at this time corresponds to the above-mentioned arrow B direction.

Figure 4B:
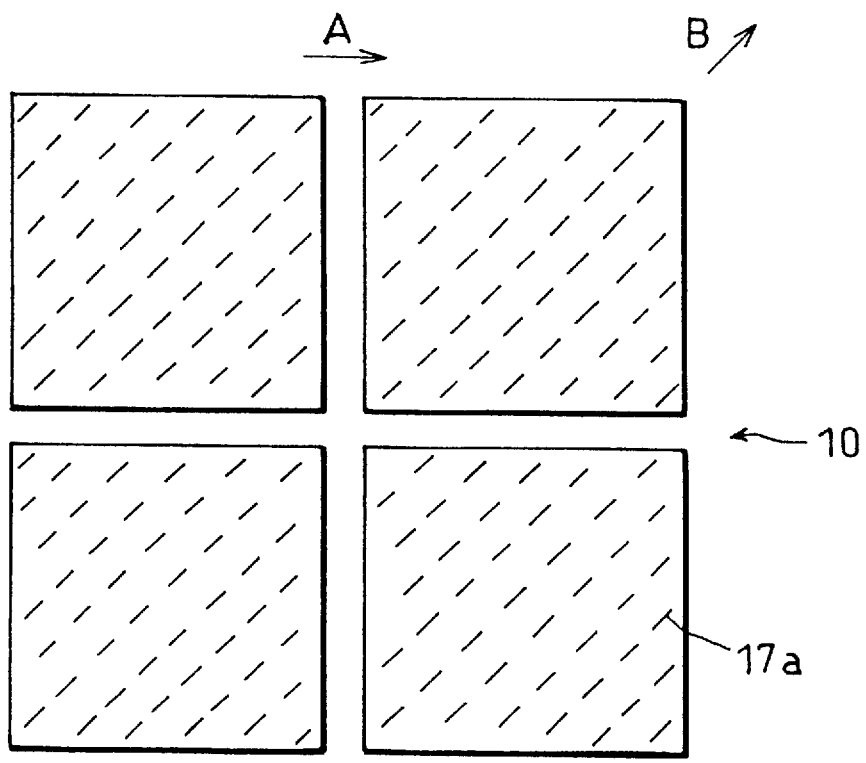
FIG. 4(b) is a schematic drawing that shows an oriented state of the liquid crystal molecules in the case when a driving voltage is applied to the liquid crystal panel of FIG. 2.

When a driving voltage is applied to the liquid crystal panel 10, all the liquid crystal molecules 17a are allowed to incline as illustrated in FIG. 4(b). In other words, the liquid crystal molecules 17a are changed in their inclination from a state where they stand while inclining with respect to the opposing substrate 11a or the pixel substrate 11b as illustrated in FIG. 1(b) to a state where they are parallel to the horizontal direction. Here, in this case, the orientation direction of the liquid crystal molecules 17a remains the same as the arrow B direction.

A nematic liquid crystal having a negative dielectric anisotropy is used as the liquid crystal material (the liquid crystal molecules 17a). Further, the width between the opposing substrate 11a and the pixel substrate 11b, that is, a cell gap corresponding to the thickness of the liquid crystal layer 17, is preferably set in the range of 1 $\mu$m to 4 $\mu$m, and when retardation of the applied liquid crystal molecules 17a is taken into consideration, it is most preferably set in the range of 2 $\mu$m to 3.5 $\mu$m. This cell gap is set at a relatively small value as compared with the cell gap (approximately 5 $\mu$m) of a conventional liquid crystal panel. Additionally, the cell gap is maintained by spacers, not shown, located between the opposing substrate 11a and the pixel substrate 11b and sealant used as the sealer 15, etc.

As illustrated in FIG. 1(b), in the above-mentioned liquid crystal layer 17, the liquid crystal molecules are controlled so as to have a pretilt angle in the range of 3° to 10° from the direction that is normal to the opposing substrate 11a or the pixel substrate 11b. In particular, the pretilt angle is most preferably set in the range of 3° to 7°, although it depends on liquid crystal materials.

The pretilt angles that are to be set on the opposing substrate 11a and the pixel substrate 11b may be the same or may be different from each other. Further, the pretilt angle may be set on only either of the substrates of the opposing substrate 11a and the pixel substrate 11b. In this case, as compared with the case in which both of the substrates have pretilt angles, the pretilt angle needs to be set at approximately double the angle thereof.

The change in the pretilt angle determines the oriented state of the liquid crystal molecules 17a in the case when no driving voltage is applied, and also determines the oriented state of the liquid crystal molecules 17a in the case when a driving voltage is applied.

More specifically, in the case when the pretilt angle, which is the initial angle of inclination of the liquid crystal molecules 17a, is large, upon application of a driving voltage, the angle of inclination of the liquid crystal molecules 17a drastically varies. For this reason, the response speed of the liquid crystal molecules increases. Further, when the pretilt angle is large, disclination lines, formed by the influence of an electric field between the adjacent pixels, are shifted to the edges of the pixel since the reverse tilt region is narrowed. The shift of the disclination lines suppresses the occurrence of disclination in a wider region, thereby increasing the effective reflectance of the pixel. Therefore, setting of a large pretilt angle in the liquid crystal molecules 17a contributes to a great degree in enhancing the brightness of the liquid crystal panel.

In order to achieve a brighter display upon application of a driving voltage to the liquid crystal panel, it is advantageous to set the pretilt angle as large as possible. However, the large angle makes the liquid crystal molecules incline too much, resulting in partial polarization in light directed to the liquid crystal layer 17. Although this type of inclination of the liquid crystal molecules 17a provides a brighter display, the density of a display area that is supposed to be black is reduced in the state where no voltage is applied, and the contrast of the image is subsequently reduced. Therefore, the pretilt angle is preferably set in the range of 3° to 7°.

The above-mentioned pretilt angle is controlled by properly choosing the material of the alignment film and setting the method, strength and direction of the rubbing process applied to the alignment film. As shown in the aforementioned FIG. 4(b), the direction of the rubbing process is set in a direction making an angle in the range of 40° to 50°, and most preferably making an angle of approximately 45° (the arrow B direction), with respect to the arrow A direction that is the horizontal direction.

In the case when the orientation direction of the liquid crystal molecules 17a, that is, the projection of each liquid crystal molecule 17a to the pixel substrate 11b, is oriented to an angle in the above-mentioned range, and most preferably to an angle of approximately 45°, with respect to the horizontal direction, the disclination lines are formed perpendicularly at the edges of the pixel, which is different from cases in which it is oriented to other angles. Therefore, the disclination lines are made parallel to lines between the pixel electrodes 14, making it possible to reduce the occurrence of disclination regions in which the orientation of the liquid crystal molecules 17a is disordered and the orientation of the liquid crystal molecules 17a becomes instable. Consequently, it becomes possible to provide a liquid crystal panel with superior display quality.

Moreover, as described earlier, the thickness of the liquid crystal layer 17, that is, the value of the cell gap, is set in the range of 2 μm to 3 μm, which is smaller as compared with the value of a conventional liquid crystal panel. This makes it possible to increase the response speed of the liquid crystal molecules and also to reduce the influence of the electric field on the adjacent pixels in the horizontal direction.

Moreover, the above-mentioned construction of the liquid crystal panel 10 make it possible to miniaturize the liquid crystal panel itself. In this case, since the cell gap is smaller as described above, the cell gap can be kept constant without using spacers.

Furthermore, by installing a phase difference plate on the opposing substrate 11a, it is possible to avoid a decrease in the density of display areas that are supposed to appear black, and consequently to suppress reduction in the contrast. Thus, it becomes possible to further increase the pretilt angle. Additionally, the above-mentioned phase difference plate may be provided on the pixel substrate 11b.

Moreover, the above-mentioned liquid crystal panel may be provided as a liquid crystal panel 20 in which a grate pattern made of a metal having a high light reflectance is formed on the opposing substrate 11a at areas that correspond to non-display sections on the liquid display panel.

Figure 5:
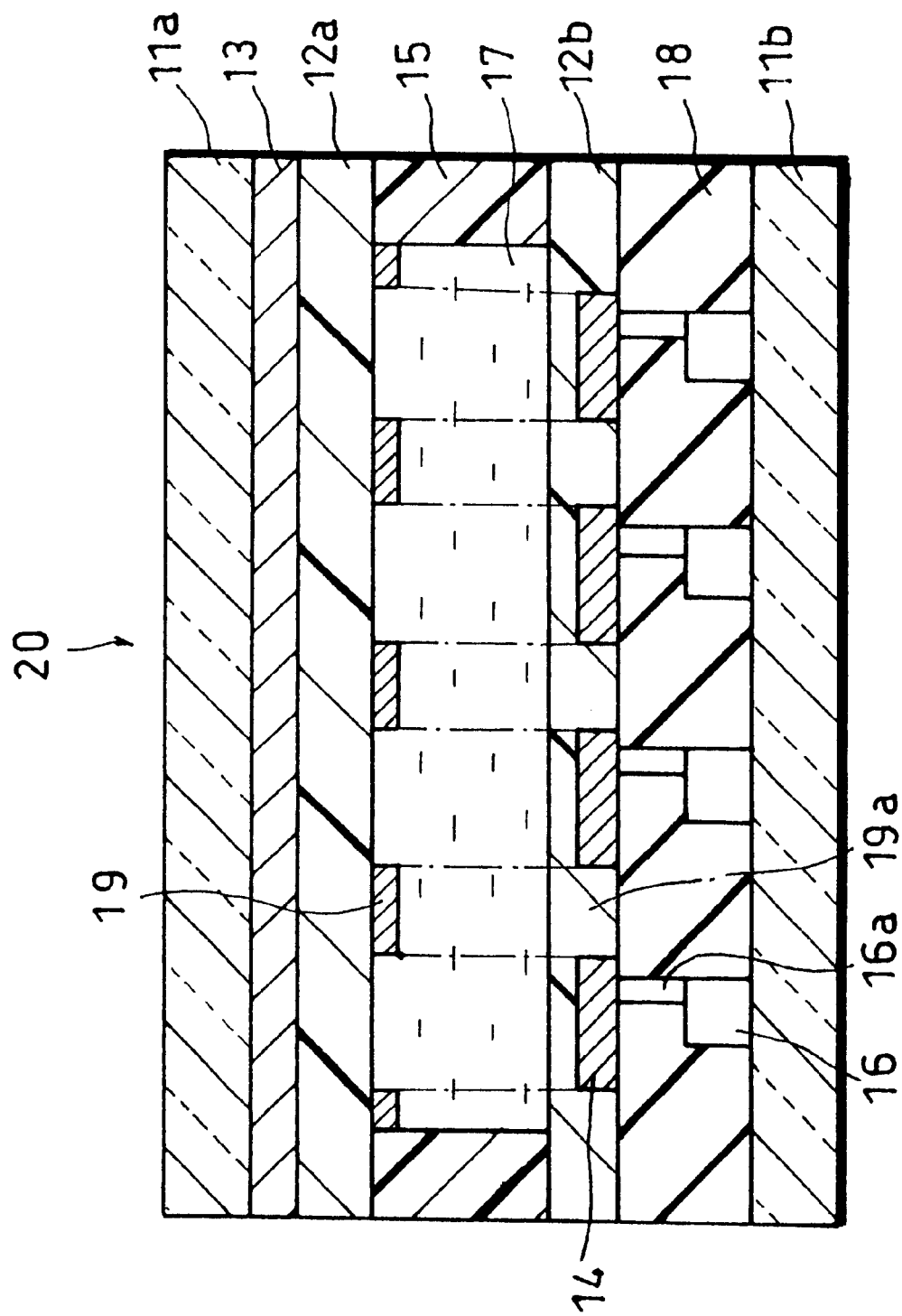
FIG. 5 is a cross-sectional view showing a construction of a modified example of the liquid crystal panel of FIG. 2.

For example, as illustrated in FIG. 5, in the above-mentioned liquid crystal panel 20, a black matrix (BM) 19, which is a metallic grate pattern, is formed on the surface of the opposing substrate 11a facing the pixel substrate 11b in the liquid crystal panel 10 shown in FIG. 2, in addition to the common electrode 13 and the alignment film 12a. This BM 19 is formed on the surface of the opposing substrate 11a facing the pixel substrate 11b as a pattern corresponding to a region 19a. The region 19a is a non-display section located between the pixel electrodes 14 that are covered with the alignment film 12b.

In the above region 19a, the wiring, such as the source electrodes 16a of TFT 16, the aforementioned scanning lines 41 and data lines 42, are formed as lower layers (the scanning lines 41 and the data lines 42 are not shown in FIG. 5). Thus, a voltage is applied to the liquid crystal layer 17 by electric potentials of the wiring. Consequently, disorders in the display, in which a desired display is not obtained or a disorder in the orientation of liquid crystal molecules occurs, are raised in the region 19a.

Therefore, the BM 19 is used for providing a black display on the image in the above region 19a so that it becomes possible to avoid adverse effects that are given on the image display by the disorders in the display of the liquid crystal layer.

Furthermore, the BM 19, which is a metallic grate pattern having such a high light reflectance, is formed on the surface of the opposing substrate 11a facing the pixel substrate 11b; therefore, among incident light rays onto the liquid crystal panel 20, those incident lights onto the BM 19 are reflected before they reach the liquid crystal layer 17. Here, since the light rays reflected by the BM 19 are not transmitted to the liquid crystal layer 17, they are returned to the light source section without being polarized by the liquid crystal layer 17. Therefore, the reflected light rays do not give adverse effects on light released from the light source section. Consequently, upon displaying an image, it is possible to prevent adverse effects caused by the disordered orientation of the liquid crystal molecules between the pixels and leakage light between the pixels.

With respect to a driving system used for the liquid crystal panel of the present invention such as the above-mentioned liquid crystal panel 10 and liquid crystal panel 20, not limited to a specific driving system, a commonly-used driving system such as the V-inversion driving system and the H-inversion (Horizontal-inversion) driving system can be adopted. However, with respect to a more preferable driving system, a driving system, which carries out an inversion of the polarity of the driving voltage for each plural lines, that is, for each two or more consecutive lines of the scanning lines 41 and/or the data lines 42, is adopted.

Normally, in the case when a liquid crystal panel of the active-matrix system, such as the above-mentioned liquid crystal panels 10 and 20, is used, an ac driving, which inverts the polarity of the driving voltage for each frame, is carried out from the viewpoint of long life of the liquid crystal panel. This is because, when a dc voltage is applied to liquid crystal for long hours, the property of the liquid crystal material deteriorates, resulting in various retrogradation phenomena. With respect to the ac driving systems, those systems, such as the V-inversion driving system, the H-inversion driving system and the dot-inversion driving system, have been known.

For example, when the liquid crystal panel 10 or 20 is driven by the V-inversion driving system, the inversion of the polarity of the driving voltage is carried out for each of the data lines 42 that are formed in the vertical direction, with respect to the pixel electrodes 14 formed on the display surface of the liquid crystal panel 10 shown in FIG. 3. This driving system, which has effects for improving the display quality such as a great reduction in flickers, is widely used as a general driving system for liquid crystal panels.

However, in the V-inversion driving system, the difference in electric potentials in the horizontal direction between the adjacent pixel electrodes 14 becomes greater, resulting in a stronger electric field in the horizontal direction. Therefore, disclination due to the reverse tilt occurs, with the result that the display becomes dark. The liquid crystal panels 10 and 20 of the present invention can effectively suppress the occurrence of disclination even in the case of the V-inversion driving system; however, when emphasis is put on the luminance of display, the v-inversion driving system fails to provide a desirable drive system.

Moreover, in cases of the H-inversion driving system in which the polarity inversion of the driving voltage is carried out for each scanning line 41 formed in the horizontal direction with respect to the pixel electrodes 14 and of the dot-inversion driving system in which the polarity inversion of the driving voltage is carried out for each pixel (each pixel electrode 14), the same problem as the V-inversion driving system is raised. In the same manner as the V-inversion driving system, since both of these driving systems have effects for improving the display quality respectively, they are widely used. Even when these driving systems are adopted, the liquid crystal display panel of the present invention effectively suppresses the occurrence of disclination. However, when emphasis is put on the luminance of display, these system also fail to provide a desirable driving system.

For this reason, with respect to the driving of the liquid crystal panel 10 or 20, the above-mentioned driving system, which carries out an inversion of the polarity of the driving voltage for each plural lines, that is, for each two or more consecutive lines of the scanning lines 41 and/or the data lines 42, is adopted.

Figure 6:
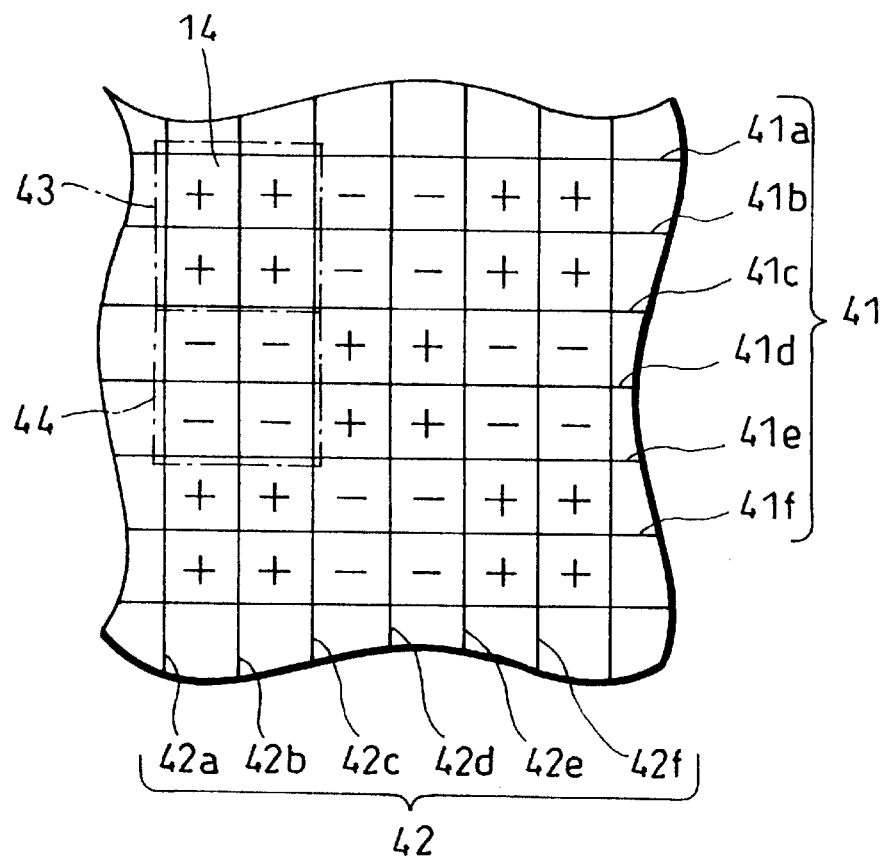
FIG. 6 is an explanatory drawing that shows a distributed state of polarities in which the polarity of a driving voltage in each area surrounded by scanning lines and data lines is indicated when an image-writing operation is carried out in the liquid crystal panel of FIG. 2.

For an example of this driving system, an explanation will be given of a case in which the polarity of the driving voltage is inverted for each consecutive two lines of the scanning lines 41 and the data lines 42. As illustrated in FIG. 6, when the liquid crystal panel 10 or 20 is driven by this driving system, the polarity inversion of the driving voltage is carried out for each region surrounded by scanning lines 41a, 41c and 41e that are alternate lines among the scanning lines 41 and by data lines 42a, 42c and 42e that are alternate lines among the data lines 42.

In this case, the polarity of the driving voltage in a region adjacent to one side of the scanning lines 41a, 41c and 41e is different from the polarity of the driving voltage in a region adjacent to the other side thereof. Further, inside the respective regions, the polarity of the driving voltage is the same within the entire region.

For example, an explanation will be given of a region 43, which is surrounded by the scanning lines 41a and 41c as well as the data lines 42a and 42c, and a region 44, which is surrounded by the scanning lines 41c and 41e as well as the data lines 42a and 42c. In the above region 43, the polarity of the driving voltage is positive (+) in the entire pixel electrodes 14. Further, in the region 44 located below the region 43 when viewed in the vertical direction with the scanning line 41c serving as a border, the polarity of the driving voltage is negative (−) in the entire pixel electrodes 14.

In other words, between one of the regions 43 adjacent to the scanning line 41c in the upward vertical direction and the other region 44 adjacent to the scanning line 41c in the downward vertical direction, the polarities of the driving voltage are different from each other. Even in the vicinities of the scanning lines 41a and 41e, each spaced by two lines from the scanning line 41c, the distribution of the polarities of the driving voltage is the same as that in the vicinity of the scanning line 41c.

On the other hand, when viewed with respect to each of the scanning lines 41, regions that are adjacent in the vertical direction with scanning lines 41b, 41d and 41f serving as borders that are adjacent to the respective scanning lines 41a, 41c and 41e have the same polarity in the driving voltage.

Here, the same is true for the data lines 42 that was true for the scanning lines 41. In other words, the regions that are adjacent in the horizontal direction to the data lines 42a, 42c and 42e serving as borders have respectively different polarities in the driving voltage. In contrast, the regions that are adjacent in the horizontal direction to the data lines 42b, 42d and 42f serving as borders have the same polarity in the driving voltage.

When the liquid crystal panel 10 or 20 is driven with the polarity of the driving voltage being distributed as described above, some portions within the regions 43 and 44 are allowed to have the same polarity in the driving voltage with respect to the adjacent pixel electrodes 14. This reduces the electric field between the adjacent pixel electrodes 14, thereby making it possible to further suppress the occurrence of disclination due to the reverse tilt.

For this reason, the liquid crystal panel 10 or 20 using the above-mentioned driving system makes it possible to effectively suppress the problem resulting from the use of the V-inversion driving system, that is, the problem in which a large electric field is exerted between the adjacent pixel electrodes 14.

In other words, when the liquid crystal panel 10 or 20 is driven by using the driving system in which the polarity of the driving voltage is inverted for each consecutive two lines or more of the scanning lines 41 and the data lines 42, it becomes possible to effectively suppress a large electric field exerted in the horizontal direction. Therefore, in the liquid crystal panel, factors which make the display dark during a driving process can be reduced as compared with a conventional system. Consequently, it becomes possible to make the display brighter in the liquid crystal panel 10 or 20.

Additionally, in the present embodiment, the driving system is arranged so that the polarity of the driving voltage is inverted for each consecutive two lines of the respective scanning lines 41 and data lines 42; however, another arrangement, which inverts the polarity of the driving voltage for each consecutive two lines or more of only either the scanning lines 41 or the data lines 42, may be adopted.

Further, instead of the above-mentioned driving system, the driving system of the liquid crystal panel 10 or 20 is more preferably arranged as follows: Upon writing an image on the liquid crystal panel 10 or 20 with a scanning line 41 currently being written serving as a border, the region located on the upper side of the scanning line 41 in the vertical direction and the region located on the lower side of the scanning line 41 in the vertical direction are allowed to have the different polarities in the driving voltage, while the polarities of the driving voltage are all kept the same within the respective regions.

Figure 7:
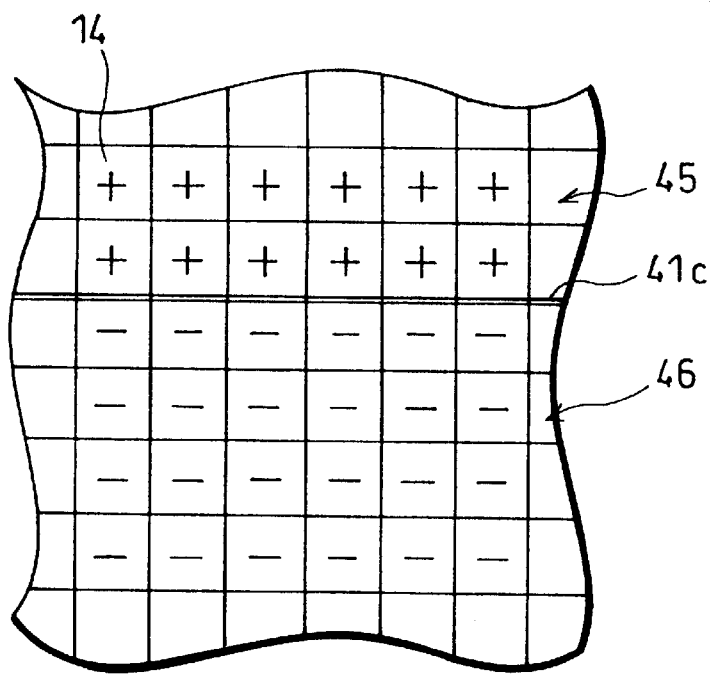
FIG. 7 is an explanatory drawing that shows another distributed state of polarities in which the polarity of a driving voltage in each area surrounded by scanning lines and data lines is indicated when an image-writing operation is carried out in the liquid crystal panel of FIG. 2.

For example, as illustrated in FIG. 7, in the case when the polarity of the driving voltage is inverted for each two lines of the scanning lines 41, it is supposed that the scanning line 41c, shown in FIG. 6, is currently being written. In this case, the polarity of the driving voltage in the region 45 adjacent to the upper side of the scanning line 41c is supposed to be positive (+) and the polarity of the driving voltage in the region 46 adjacent to the lower side is supposed to be negative (−). Moreover, with respect to all the pixel electrodes 14 within the region 45, the polarities of the driving voltage are all set positive (+), and with respect to all the pixels 14 within the region 46, the polarities of the driving voltage are, on the other hand, all set negative (−).

As described above, in the driving system of the liquid crystal panel 10 or 20, the polarity of the driving voltage in one region (region 45 on the upper side) adjacent to the scanning line 41c that is currently being written and the polarity of the driving voltage in the other region (region 46 on the lower side) are different from each other. Moreover, within each of the regions (region 45 and region 46), the polarities of the driving voltage are all kept the same. Consequently, on the liquid crystal panel 10 or 20 being driven, the adjacent pixel electrodes 14 within the same region have mutually the same polarity of the driving voltage, and outside the region being subject to a writing process, the polarities of the driving voltage are all kept the same.

This arrangement reduces the electric field exerted in the direction along the formation of the scanning lines 41 between the adjacent pixel electrodes 14, thereby making it possible to further suppress the occurrence of disclination due to the reverse tilt. Therefore, in the liquid crystal panel 10 or 20, factors which makes the display dark during a driving process can be reduced as compared with a conventional system, and consequently, it becomes possible to make the display brighter.

Additionally, when not combined with the driving system which inverts the polarity of the driving voltage for each consecutive plural lines of the scanning lines 41 and/or the data lines 42, the above-mentioned driving system is the same as the frame-inversion driving system. When the liquid crystal panel 10 is driven by using this frame-inversion driving system, the polarity of the driving voltage is inverted with respect to all the pixel electrodes 14 formed in the display surface of the liquid crystal panel 10. Therefore, the difference in electric potentials in the horizontal direction between the adjacent pixel electrodes 14 becomes smaller, making the electric field exerted in the horizontal direction smaller. Therefore, it becomes possible to prevent the occurrence of disclination due to the reverse tilt of the liquid crystal molecules, and consequently to provide a brighter display as compared with the V-inversion driving system, etc.

The frame-inversion driving system is not commonly used as a driving system for general liquid crystal panels since it tends to cause degradation in the display quality such as flickers (flickers on the screen). However, even in the frame-inversion driving system, the image display quality can be improved, for example, by increasing the frame frequency so as not to let the observer recognize flickers. Therefore, this driving system is more suitable for the driving system of the liquid crystal panel 10 or 20 of the present invention in which emphasis is placed on the brightness of the display, as compared with the commonly-used V-inversion driving system.

Next, an explanation will be given of a projection-type liquid crystal display 30 of the present invention in which the above-mentioned reflection-type liquid crystal display panel is used.

Figure 8:
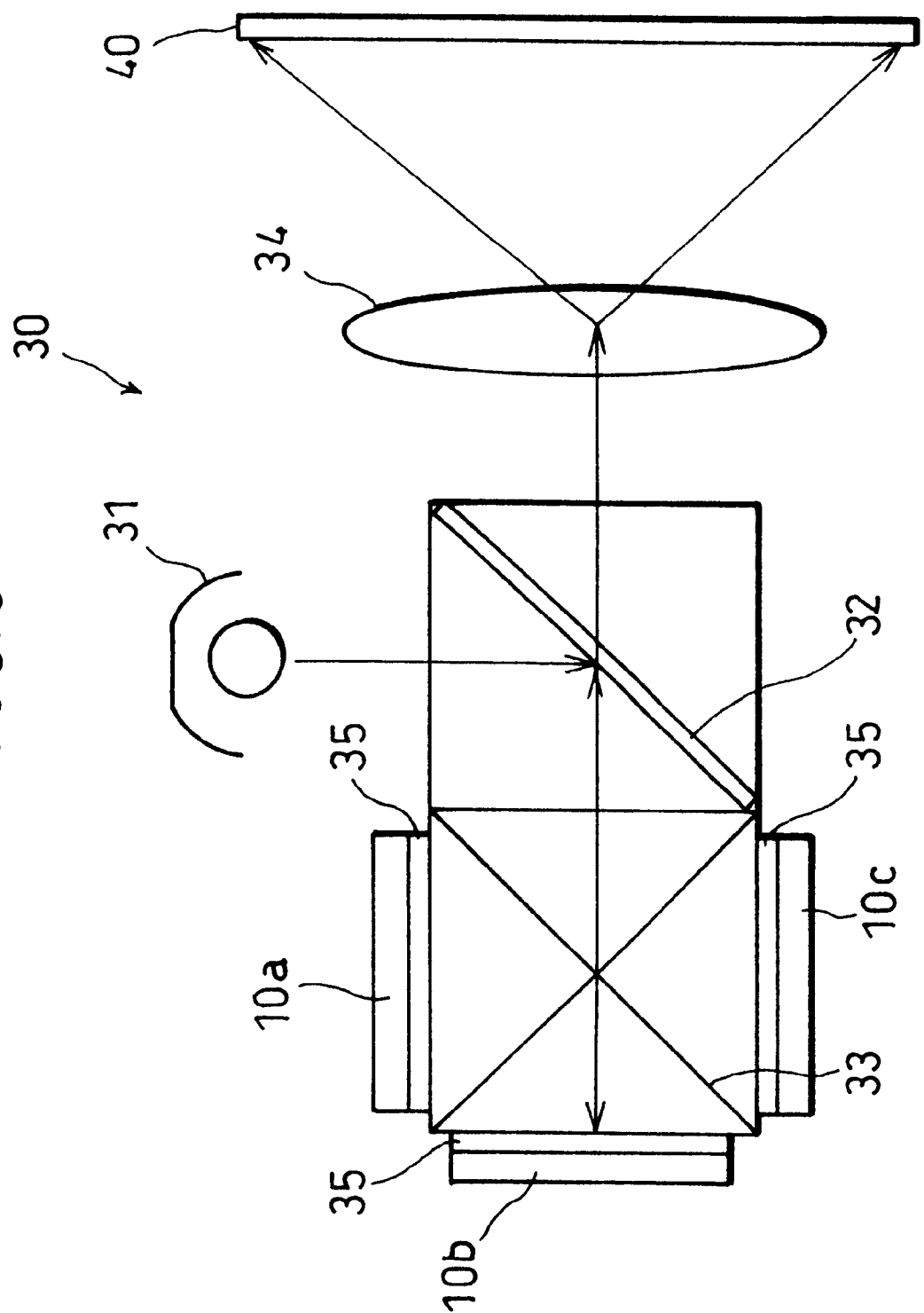
FIG. 8 is a block diagram that shows a construction of a projection-type liquid crystal display in which the liquid crystal panel of FIG. 2 is used.

As illustrated in FIG. 8, the projection-type liquid crystal display 30 of the present invention is constituted by a lamp 31 serving as an incident light source, a polarizing beam splitter (PBS) 32, a cross dichroic prism 33, liquid crystal panels 10a, 10b and 10c, a projection lens 34, phase-difference plates 35 and a screen 40.

Each of the liquid crystal panels 10a, 10b and 10c is the liquid crystal panel 10 having the above-mentioned arrangement, and is placed one by one on each of the three surfaces of the cross dichroic prism 33. The liquid crystal panels 10a and 10c are placed in a manner so as to sandwich the cross dichroic prism 33 from its side faces. Further, the liquid crystal panel 10b is placed on the surface of the cross dichroic prism 33 that faces the rear of the liquid crystal display 30.

In other words, the cross dichroic prism 33 is arranged inside the three liquid crystal panels 10a, 10b and 10c that are arranged in a ]-letter (a Japanese Katakana character) shape. Further, the liquid crystal panel 10b, the cross dichroic prism 33, the PBS 32 and the projection lens 34 are arranged virtually rectilinearly in one row in this order. Moreover, the lamp 31 is placed at a position from which it can supply the PBS 32 with incident light and at which it does not obstruct the path of the supplied incident light toward the screen 40.

The above-mentioned liquid crystal panel 10a, 10b and 10c respectively share light rays of red (R), green (G) and blue (B) on the display screen. In other words, when light rays, which have been made incident and separated, are reflected by the respective liquid crystal panels 10a, 10b and 110c, only the colors related to the respective liquid crystal panels 10 are reflected. In the present embodiment, the liquid crystal panel 10a deals with light ray R, the liquid crystal panel 10b deals with light ray G, and the liquid crystal panel 10c deals with light ray B, so as to reflect the respective light rays.

The respective light rays R, G and B, reflected by the liquid crystal panels 10a, 10b and 10c, are composed while passing through the cross dichroic prism 33 and the PBS 32, enlarged by the projection lens 34, and then released so as to be projected onto the screen 40. Thus, a color image display is carried out.

Phase difference plates 35 are provided on the front surfaces of the liquid crystal panels 10a, 10b and 10c, that is, on the rear surface sides of the opposing substrates of the respective liquid crystal panels 10a, 10b and 10c. Only one phase difference plate 35 may be placed on each liquid crystal panel 10, or two or more phase difference plates 35 may be stacked thereon.

Figure 9:
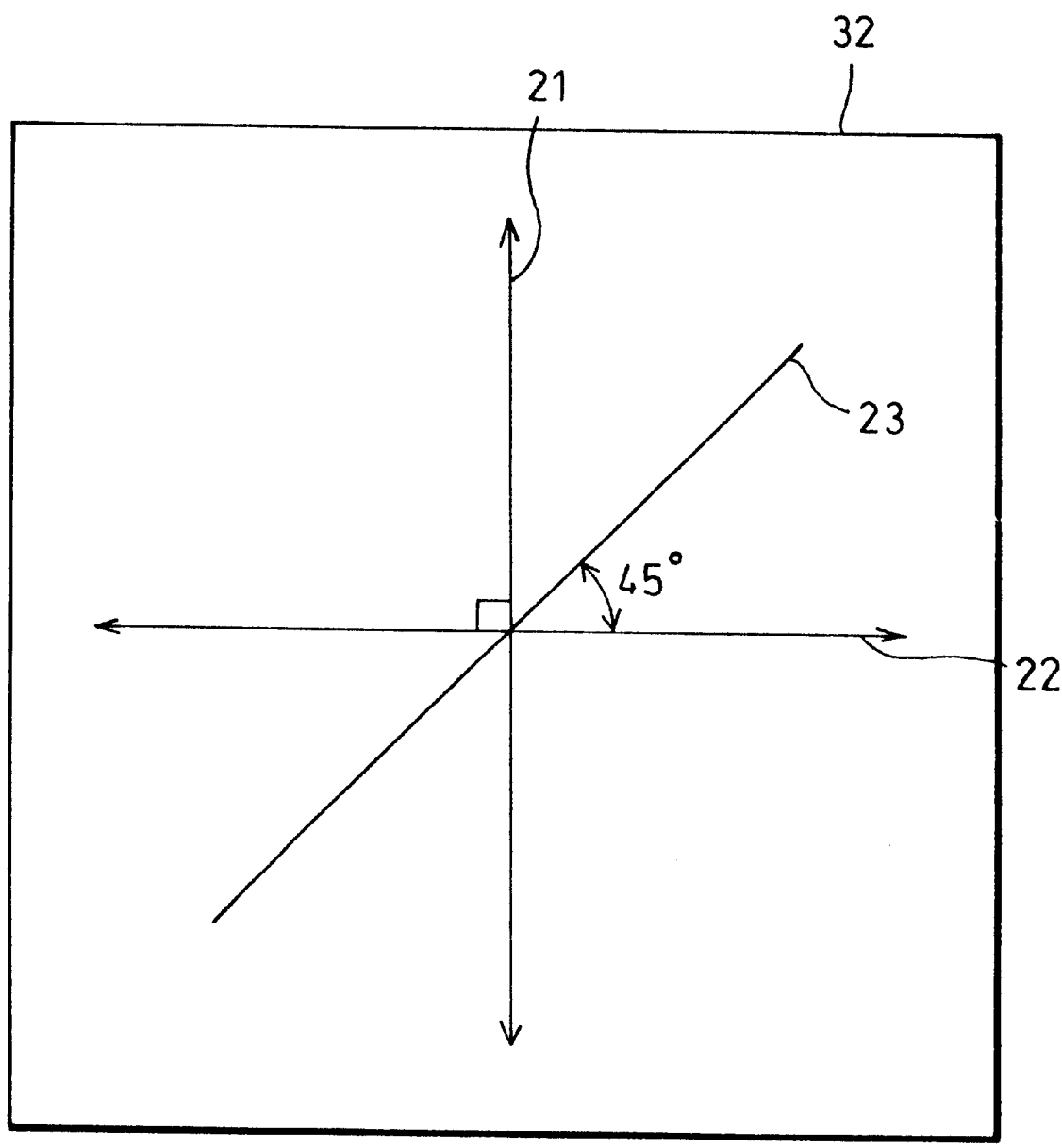
FIG. 9 is an explanatory drawing that shows the relationship between the orientation direction of liquid crystal molecules in the horizontal direction of the liquid crystal panel and the polarizing axis of a polarizing beam splitter in the liquid crystal display of FIG. 7.

The PBS 32 is arranged so that two polarizing beam splitters are composed so as to have their respective polarization axes aligned virtually orthogonally to each other. In other words, as illustrated in FIG. 9, the incidence polarization axis 21 on the light incident side and the light-releasing polarization axis 22 on the light-releasing side in the PBS 32 are orthogonal to each other. Further, each of the incidence polarization axis 21 and the light-releasing polarization axis 22 is arranged so as to have an angle of 45° with respect to the direction 23 of the orienting process.

Next, an explanation will be given of an image displaying operation in the above-mentioned liquid crystal display 30.

The driving operation for the liquid crystal molecules of the liquid crystal panels 10a, 10b and 10c is carried out by a normal active-matrix driving system. With respect to the method for applying a driving voltage to the liquid crystal molecules during the driving process by the active-matrix driving system, the following driving systems are listed: the frame-inversion driving system, the V-inversion driving system, the H-inversion driving system and the dot-inversion driving system. In general, with respect to driving systems for the liquid crystal panel, driving systems, in which the driving voltages to be applied to the adjacent pixel electrodes have mutually different polarities, such as the V-inversion driving system, the H-inversion driving system and the dot-inversion driving system, are commonly used in order to reduce crosstalk, shadowing, etc.

However, in the liquid crystal panel 10 or 20 of the present invention, emphasis is placed on brightness of the display. Therefore, driving systems (including the frame-inversion driving system), which provide portions in which the polarities of the driving voltage between the adjacent pixel electrodes are kept the same as shown in FIG. 6 or FIG. 7, are preferably adopted.

In response to the intensity of the driving voltage that has been applied to the pixel electrodes by using the above-mentioned driving system, the orientation of the liquid crystal molecules is allowed to vary from the initial state to the lowest energy state. This variation in the oriented state changes the retardation of the liquid crystal layer 17, thereby changing the polarizing state of light that passes through the liquid crystal layer 17.

Light, released from the lamp 31 serving as the incident light source, is made incident on the liquid crystal panels 10a, 10b and 10c which have been subjected to the above-mentioned change in the polarizing state. In this case, when reflected by the PBS 32, the light from the lamp 31 forms a linearly polarized light ray, and this is separated into light rays of R, G and B when passing through the cross dichroic prism 33. Next, while passing through the liquid crystal layers 17 of the liquid crystal panels 10a, 10b and 10c, these linearly polarized light rays have their polarized state appropriately changed.

The light rays, whose polarized states have been changed, are reflected by the pixel electrodes of the liquid crystal panels 10a, 10b and 10c that also serve as reflection plates. These reflected light rays have their polarized state changed in accordance with the states of the liquid crystal layers 17 of the respective liquid crystal panels 10. Here, the reflected light ray from the liquid crystal panel 10a corresponds to R, the reflected light ray from the liquid crystal panel 10b corresponds to G, and the reflected light ray from the liquid crystal panel 10c corresponds to B. These light rays of R, G and B pass through the PBS 32 via the cross dichroic prism 33. These light rays are released from the projection lens 34, and then projected onto the screen 40.

In the above-mentioned liquid crystal display 30, liquid crystal molecules of each of the liquid crystal panels 10a, 10b and 10c are allowed to have a greater response speed by utilizing their curved deformation. Further, since the cell gap of the liquid crystal layer 17 is small, the response speed of the liquid crystal molecules can be increased. Moreover, the response speed can be further increased by making the pretilt angle of the liquid crystal molecules greater. Consequently, the image-writing time on the liquid crystal panels 10a, 10b and 10c can be shortened, and it becomes possible to display images more smoothly.

Moreover, as described earlier, the application of the phase difference plates 35 reduces the degradation in contrast resulting from the increase of the pretilt angle. The phase difference plates 35 may be provided by combining a plurality of them in order to suppress a reduction in density on black display. Additionally, the phase difference plates 35 are used for compensating for the phase difference in light that passes through the liquid crystal layers 17 of the liquid crystal panels 10a, 10b and 10c. Therefore, the phase difference plates 35 make it possible to increase the contrast of the display image of the liquid crystal display 30, thereby improving the display quality.

Moreover, since the cell gap of the above-mentioned liquid crystal panels 10a, 10b and 10c is small, the influence of the electric field exerted on the adjacent pixels in the horizontal direction is minimized. Additionally, in order to further minimize the influence of the electric field in the horizontal direction, the cell gap may be further reduced, and the resulting phase difference may be compensated by using the above-mentioned phase difference plates 35.

In addition, when no driving voltage is applied to them, the display of the liquid crystal panels 10a, 10b and 10c becomes black; therefore, it is possible to avoid the state in which the spacers, used for maintaining the cell gap, become conspicuous. Moreover, since the liquid crystal panel itself is small and since the cell gap is also small, it is possible to design the apparatus without using the spacers.

As described above, the liquid crystal panel having characteristics as described below can be obtained by properly carrying out the setting of the pretilt angle of the liquid crystal molecules, the setting of the cell gap of the liquid crystal layer, the selection of the driving system for the liquid crystal panel and the use of the phase difference plates. In other words, even if the property values of liquid crystal molecules are different, it is possible to achieve improvements in the display quality, such as an improvement in the efficiency of use of the incident light, a brighter image display and an increased contrast. In addition, it is possible to obtain a liquid crystal panel of, for example, the reflection type which is capable of high-speed response. Moreover, the application of the liquid crystal panel makes it possible to provide a small-size projection-type liquid crystal display capable of providing a brighter image display. Since the liquid crystal panel can be miniaturized, the entire liquid crystal display can be miniaturized and the manufacturing cost can be reduced.

Additionally, in the above-mentioned embodiment, the TFT is used for an active element for applying a driving voltage to the pixel electrodes; however, another element such as MIM (Metal Insulator Metal) may be used as the active element. Moreover, in the present embodiment, the explanations were given by exemplifying the liquid crystal panel that refers to the reflection type in the type of light utilization for displaying images; however, the present invention is not limited to this type of light utilization of the liquid crystal panel, and the transmission type may be adopted. In the case of the transmission type, however, it is difficult to set the thickness of the liquid crystal layer in the range of 1 $\mu$m to 4 $\mu$m.

Next, referring to Figures, the following description will discuss specific embodiments of a liquid crystal panel used in the liquid crystal display of the present invention.

Embodiment 1

In the liquid crystal panel 10 as illustrated in FIG. 2, an image displaying operation was carried out by using liquid crystal molecules having a birefringence of $\Delta n=0.0825$ and $\Delta\epsilon=-4.2$ under the condition that the cell gap of the liquid crystal layer 17 is set at $d=2.3\ \mu m$.

With respect to an image obtained from the image-displaying simulation on the liquid crystal panel 10 under this condition, in the case of a pretilt angle of 0.1°, disclination occurred over the entire pixels due to the reverse tilt region, as illustrated in FIG. 10(*a*). In contrast, in the case of a pretilt angle of 3°, disclination occurred only in the vicinity of non-display portions along the borders of the respective pixels, as illustrated in FIG. 10(*b*). Moreover, in the case of a pretilt angle of 5°, disclination occurred only in the vicinity of non-display portions in the same manner as the pretilt angle of 3°, as illustrated in FIG. 10(*c*), with a slightly smaller reverse tilt region as compared with the case of the pretilt angle of 3°. Here, in the display areas in the simulations as shown in FIGS. 10(*a*), 10(*b*) and 10(*c*), one side is set at 56.0 $\mu m$. Further, the orientation direction of the liquid crystal molecules is indicated by the direction of the arrow.

Moreover, under the above-mentioned condition, the relationship between the average reflectance of incident light on the liquid crystal panel 10 and the pretilt angle of the liquid crystal molecules is described as follows: As illustrated in FIG. 11, the average reflectance was relatively high in the case of a pretilt angle ranging from 1° to 10°; however, the average reflectance abruptly dropped in the case of a pretilt angle of less than 1°.

Figure 12:
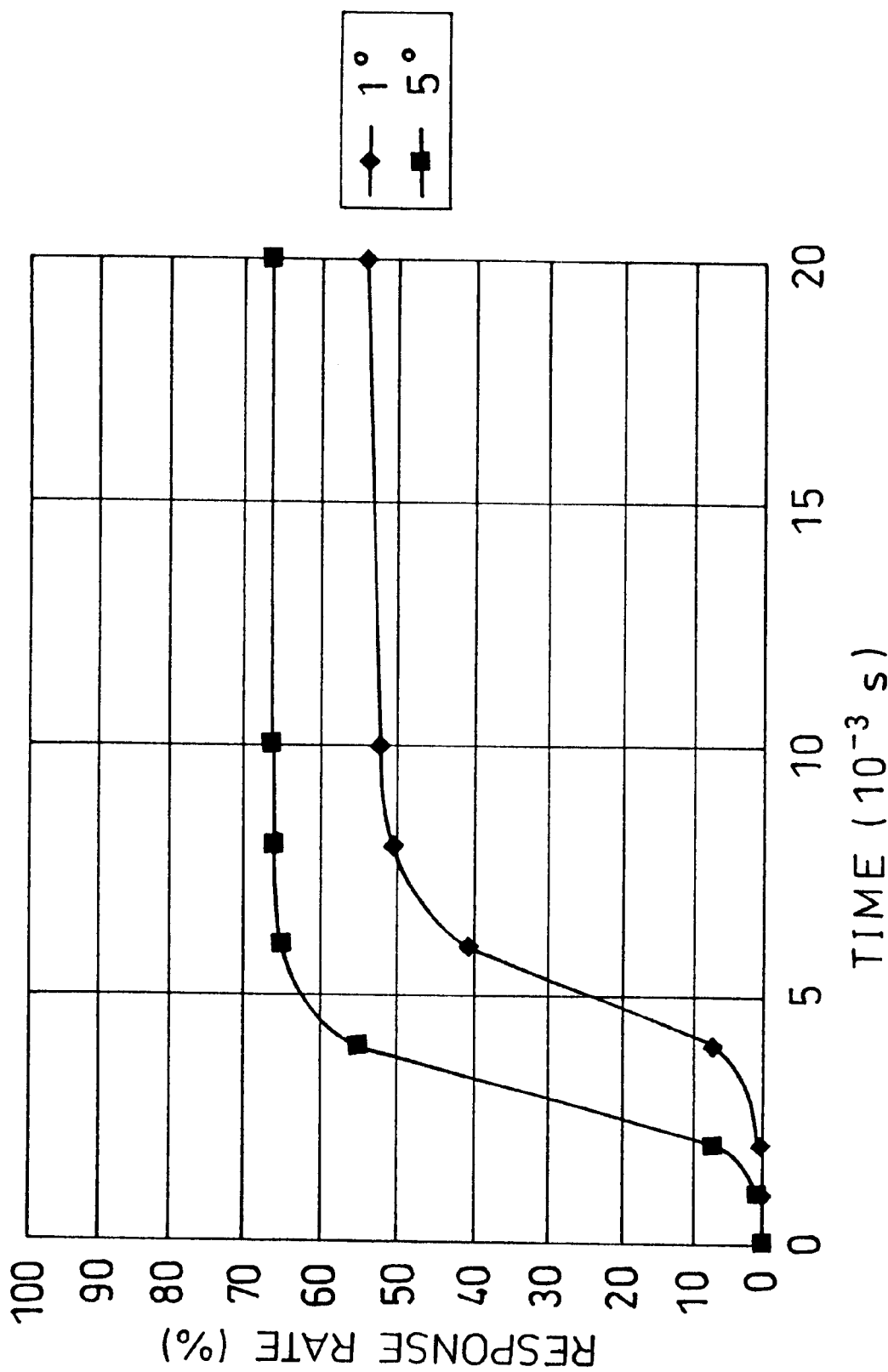
FIG. 12 is a graph that shows the relationship between the response rate and time of the liquid crystal panel used in the liquid crystal display of the present invention.

Furthermore, with respect to the response speed of the liquid crystal panel 10 under the above-mentioned condition, calculations were made in the case of a pretilt angle of 1° as well as in the case of a pretilt angle of 5°. As illustrated in FIG. 12, the response speed was high in both of the cases, and in particular, it was found that the response rate became high in the case of the angle of 5°.

In the present embodiment, the calculation on the reflection-type liquid crystal panel showed that a contrast as high as approximately 3000 could be achieved. Moreover, in the reflection-type liquid crystal panel, in the case when a reflectance of not less than 90% was maintained under the state that the liquid crystal was not driven, a brightness with a reflectance of approximately 65% was achieved under the state that the liquid crystal was driven. At this time, the V-inversion driving system was adopted as the driving system for the liquid crystal.

Additionally, the above-mentioned driving system is not intended to be limited to the V-inversion driving system, and the H-inversion driving system may be adopted. The liquid crystal panel of the present invention makes it possible to provide a liquid crystal panel having a high reflectance independent of the difference in driving methods of the liquid crystal.

Embodiment 2

In the present embodiment, a liquid crystal panel 10 shown in FIG. 2, which is the same liquid crystal panel as that of Embodiment 1, was used. In the liquid crystal panel 10, liquid crystal molecules having a birefringence of $\Delta n=0.0825$ and $\Delta\epsilon=-4.2$ were used under the condition that the cell gap of the liquid crystal layer 17 was set at $d=2.3\ \mu m$, in the same manner as the aforementioned Embodiment 1. Here, the pretilt angle of the liquid crystal molecules was set at 5°.

With respect to a case in which the following driving system was used for the liquid crystal panel 10, an image displaying operation was carried out. In other words, in the driving system, with the scanning line 41 that is being subject to a writing operation serving as a border, the polarity of the driving voltage in a region adjacent to the scanning line 41 on the upper side thereof and the polarity of the driving voltage in a region adjacent thereto on the lower side are made different from each other, and within each region, the polarities of the driving voltage are all made the same.

Figure 13:
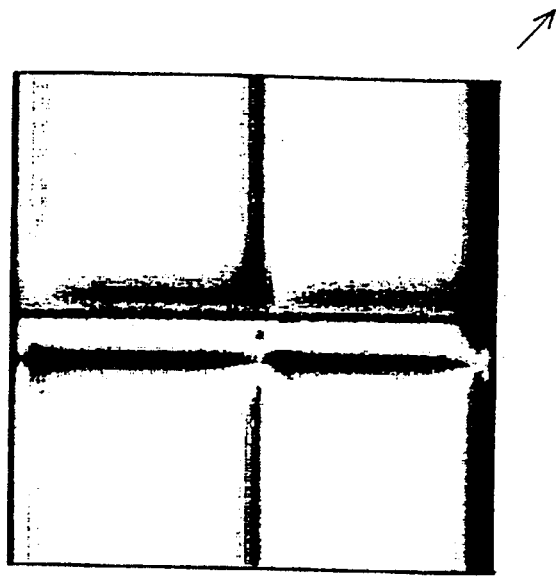
FIG. 13 is an explanatory drawing that shows another image obtained by an image-displaying simulation in the liquid crystal panel of FIG. 2.
Figure 14:
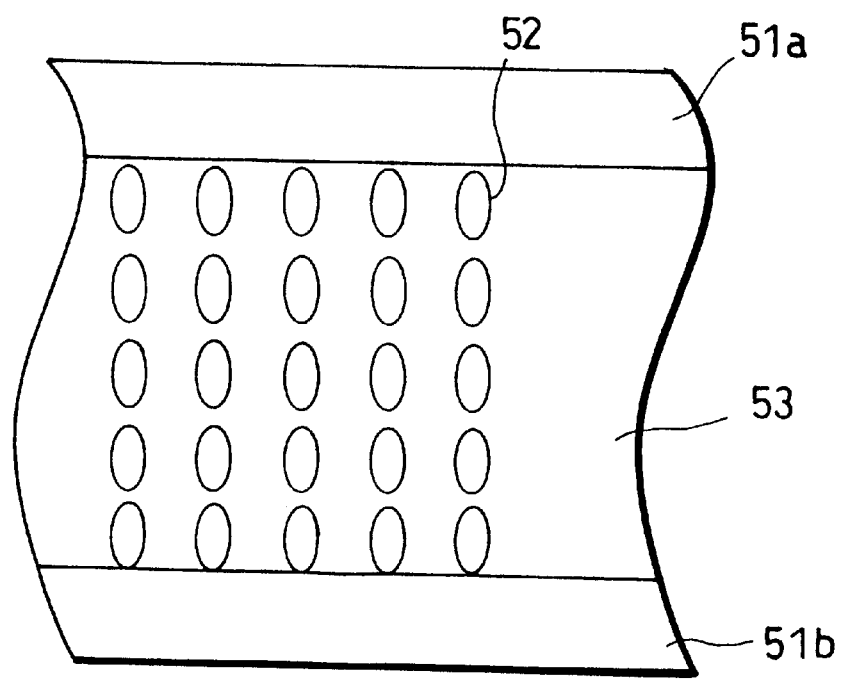
FIG. 14 is a schematic cross-sectional view that shows a state in which liquid crystal molecules are oriented in a tilted state in a liquid crystal layer of a conventional liquid crystal panel.

With respect to an image obtained from the image-displaying simulation on the liquid crystal panel 10 under this condition, disclination occurring in the vicinity of non-display portions along the borders of the respective pixels became remarkably smaller as compared with the case of Embodiment 1 as illustrated in FIG. 13. Here, in the display areas in the simulations of FIG. 13, one side is set at 56.0 $\mu m$, as in the case of FIGS. 10(*a*), 10(*b*) and 10(*c*). Further, the orientation direction of the liquid crystal molecules is indicated by the direction of the arrow.

In the above-mentioned liquid crystal panel 10, in the case when a reflectance of not less than 90% was maintained under the state that the liquid crystal was not driven, brightness with a reflectance of approximately 88% was achieved under the state that the liquid crystal was driven. Therefore, a very bright liquid crystal panel was obtained as compared with cases in which the V-inversion driving system, the H-inversion driving system and the Dot-inversion driving system were adopted as described in Embodiment 1. Here, in the driving system of the present Embodiment, the occurrence of crosstalk and flickers slightly increases as compared with other driving systems. However, by adopting a construction for minimizing the coupling capacity or for increasing the frame frequency, the occurrence of crosstalk and flickers can be suppressed so that it becomes possible to avoid degradation in the display quality. Further, the region of disclination can be further minimized by increasing the pretilt angle. Consequently, when the pretilt angle of the liquid crystal molecules is set in the range of 3° to 10°, and more preferably in the range of 3° to 7°, with respect to the direction that is normal to the opposing substrate or the pixel substrate, it is possible to suppress the reverse tilt occurring in a wide region. The suppression of the occurrence of the reverse tilt region makes it possible to avoid the disclination line from giving adverse effects on the image display. Therefore, it becomes possible to obtain a liquid crystal panel of the birefringence controlling system with higher quality.

Moreover, driving systems which provide portions in which the polarities of the driving voltage between the adjacent pixel electrodes are kept the same are preferably adopted as the driving system of the liquid crystal panel; thus, it becomes possible to obtain a liquid crystal panel of the birefringence control system with higher display quality. Furthermore, a projection-type liquid crystal display using this liquid crystal panel has a small size and can display brighter images.

In the liquid crystal panel of the present invention, the reflection type is preferably used as the type of light utilization for displaying images, and the thickness of the liquid crystal layer is preferably set in the range of 1 $\mu m$ to 4 $\mu m$.

With the above-mentioned arrangement, the thickness of the liquid crystal layer, that is, the cell gap, can be reduced to a value smaller than the value (approximately 5 $\mu m$) of a conventional liquid crystal display by using the reflection type as the type of light utilization for displaying images. Consequently, the response speed of the liquid crystal molecules can be increased, and the influence of the electric field exerted on the adjacent pixels in the horizontal direction can be minimized. Moreover, since the cell gap is small, spacers for maintaining the cell gap may be omitted in the case when the liquid crystal panel itself is miniaturized.

In the liquid crystal display panel of the present invention, it is preferable to set the orientation direction of the liquid crystal molecules in the range of 40° to 50° with respect to the direction in which the scanning lines are formed in the pixel substrate.

With the above-mentioned arrangement in which the orientation direction of the liquid crystal molecules is set in the range of 40° to 50°, and more preferable at 45°, the disclination line is made parallel to the lines between the pixel electrodes so that the regions in which the orientation of the liquid crystal molecules is distorted or the orientation of the liquid crystal molecules becomes instable are reduced, as compared with cases of other orientation angles. In contrast, in orientation directions other than the above-mentioned range, the occurrence of disorder in image display due to domains and the occurrence of dark portions on the display screen are increased. Therefore, by setting the orientation direction of the liquid crystal molecules in the range of 40° to 50° as described above, it is possible to obtain a liquid crystal panel with higher display quality.

In the liquid crystal panel of the present invention, it is preferable to provide a phase difference plate on the rear surface side of either the opposing substrate or the pixel substrate.

With this arrangement, the phase difference in light passing through the liquid crystal layer can be compensated by using the phase difference plate provided on the rear surface side; thus, it becomes possible to reduce degradation in the contrast resulting from the increased pretilt angle.

Moreover, the value of the cell gap is further reduced in order to minimize the influence of the electric field exerted in a direction parallel to the direction in which the scanning lines are formed between the adjacent pixels. The phase difference resulting from the reduced cell gap can be compensated by using the phase difference plate. Therefore, it becomes possible to improve the contrast of display images.

In the liquid crystal panel of the present invention, it is preferable to form a grate pattern made of a metallic material on the opposing substrate so as to provide regions corresponding to non-display sections between the electrodes formed in the pixel substrate.

With the above-mentioned arrangement, although the display in the liquid crystal layer tends to be disordered due to electric potentials of the wiring formed in the region between the pixel electrodes on the pixel substrate, it is possible to prevent the disorder in the display from giving adverse effects on images by allowing the above-mentioned region to become black on the display by the use of the grate pattern made of a metallic material.

Moreover, since the metallic grate pattern is formed on the opposing substrate, it reflects light that is made incident on the liquid crystal panel, and the reflected light, which is not allowed to pass through the liquid crystal layer, is returned to the light source section without being polarized such that no adverse effects are given to the output light. Therefore, it is possible to prevent the disorder in the liquid crystal molecules between the pixels and leakage light between the pixels.

In the liquid crystal panel of the present invention, it is preferable to drive the liquid crystal panel by using the driving system which inverts the polarity of the driving voltage for each two or more lines of the scanning lines and/or data lines that are provided on the pixel substrate.

With the above-mentioned arrangement, there are portions in which the polarities of the driving voltage between the adjacent pixel electrodes are kept the same on the liquid crystal panel that is being driven. This reduces the electric field exerted between the adjacent pixel electrodes, thereby making it possible to further suppress the occurrence of disclination due to the reverse tilt. Therefore, since factors which make the display dark during a driving process can be reduced as compared with a conventional system, it becomes possible to make the display brighter in the liquid crystal panel.

In the liquid crystal panel of the present invention, the liquid crystal panel is preferably driven by the driving system in which: with the scanning line that is being subject to a writing operation serving as a border, the polarity of the driving voltage in a region adjacent to the scanning line on one side thereof and the polarity of the driving voltage in a region adjacent thereto on the other side are made different from each other, and within each region, the polarities of the driving voltage are all kept the same.

With the above-mentioned arrangement, on the liquid crystal panel that is being driven, the polarities of the driving voltage between the pixel electrodes that are adjacent in the direction along the formation of the scanning lines are made the same, and in regions other than those being subjected to a writing operation, the polarities of the driving voltage are all made the same. This arrangement reduces the electric field exerted in the direction along the formation of the scanning lines between the adjacent pixel electrodes, thereby making it possible to further suppress the occurrence of disclination due to the reverse tilt. Therefore, upon driving the liquid crystal panel, factors which make the display dark during a driving process can be reduced as compared with a conventional system, and consequently, it becomes possible to make the display brighter.

The liquid crystal display of the present invention features that the above-mentioned liquid crystal panel is provided therein.

With this arrangement, the use of the liquid crystal panel makes it possible to provide a small-size projection-type liquid crystal display which has high response speeds and can display brighter images. In addition, since the liquid crystal panel can be miniaturized, the entire liquid crystal display can be miniaturized and the manufacturing cost can be reduced.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A liquid crystal panel comprising:

a pixel substrate having scanning lines extending in a first direction, signal lines extending in a second direction crossing said scanning lines, switching elements, pixel electrodes arranged in a matrix forming rows in the first direction and columns in the second direction, and an alignment film, wherein each of the pixel electrodes is connected to a corresponding one of said scanning lines and a corresponding one of said signal lines through a corresponding one of said switching elements;

an opposing substrate having an electrode layer and an alignment film;

a liquid crystal layer sealed between said pixel substrate and said opposing substrate; and a driving system for driving said scanning lines and said signal lines, wherein the molecules of the liquid crystal layer have a negative dielectric anisotropy and incline with a pretilt angle in a range of 3° to 10° with respect to the direction which is normal to said pixel substrate or said opposing substrate, wherein the alignment direction of the alignment films of said pixel substrate and said opposing substrate is at an angle of about 45° with respect to the first direction, and wherein said driving system drives said scanning lines and said signal lines such that adjacent groups of two or more adjacent pixels at least in a row direction are supplied with driving voltages of opposite polarity.

2. A liquid crystal display device comprising one or more liquid crystal display panels in accordance with claim 1.

3. The liquid crystal panel as defined in claim 1, wherein said driving system drives the scanning lines and data lines such that adjacent groups of two or more adjacent pixels in a row direction are supplied with driving voltages of opposite polarity and adjacent groups of two or more adjacent pixels in a column direction are supplied with driving voltages of opposite polarity.

* * * * *